J. DAVIS.
SPRING TIRE.
APPLICATION FILED APR. 15, 1920.
1,387,360.
Patented Aug. 9, 1921.
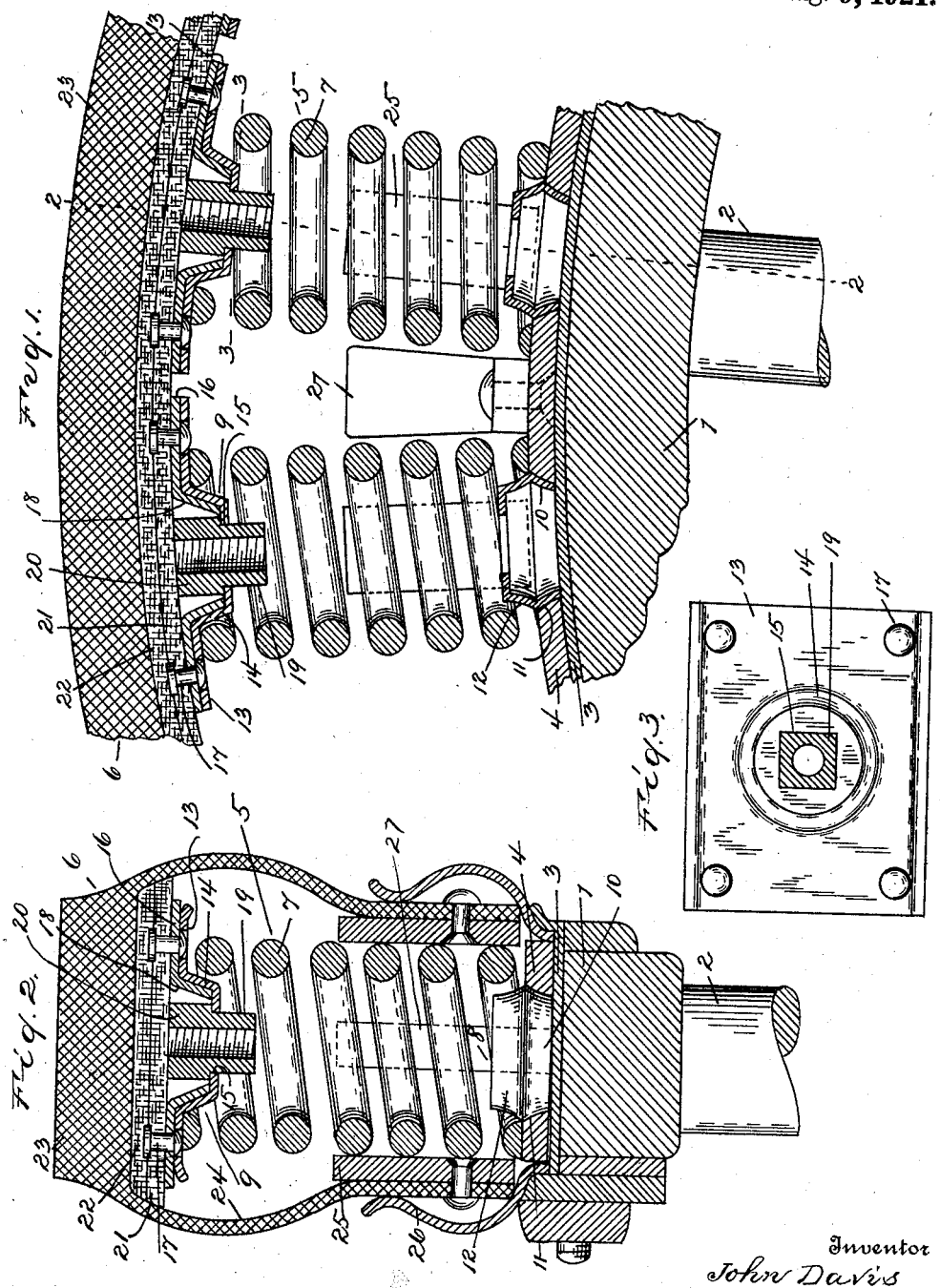
Inventor
John Davis
By Whittemore Hulbert & Whittemore,
Attorneys

UNITED STATES PATENT OFFICE.

JOHN DAVIS, OF DETROIT, MICHIGAN.

SPRING-TIRE.

1,387,360. Specification of Letters Patent. Patented Aug. 9, 1921.

Application filed April 15, 1920. Serial No. 374,226.

*To all whom it may concern:*

Be it known that I, JOHN DAVIS, a citizen of the United States of America, residing at Detroit, (post-office address, 75 Longfellow avenue,) in the county of Wayne and State of Michigan, have invented certain new and useful Improvements in Spring-Tires, of which the following is a specification, reference being had therein to the accompanying drawings.

The invention relates to spring tires and has for one of its objects, the provision of a spring tire having a spring section which comprises a plurality of spring elements and is attachable to or detachable from the felly of a wheel as a unit. Another object is to provide a pliable fibrous band surrounding the spring elements and secured to means for positioning the outer abutments or caps of these spring elements. A further object is the provision of means for relieving the spring elements from circumferential and side thrusts. The invention has for still other objects the novel arrangements and combinations of parts as more fully hereinafter set forth.

In the drawings:

Figure 1 is a central longitudinal section through a portion of a wheel felly and a spring tire embodying my invention;

Fig. 2 is a cross section on the line 2—2 of Fig. 1;

Fig. 3 is a cross section on the line 3—3 of Fig. 1.

1 is the felly of the wheel, 2 are the spokes and 3 is the felly band permanently secured to the felly and upon which is mounted the spring tire.

The spring tire comprises the slip rim 4 engageable with the felly band 3, the spring elements 5 arranged circumferentially around the slip rim 4 and the tread member or casing 6. The spring elements 5 each consists of the coil spring 7, the axis of which extends radially of the wheel and the inner and outer spring abutments 8 and 9 respectively. The inner abutment has the inner conical portion 10 which fits in an aperture 11 in the slip rim 4, and also has the outer conical portion 12 extending beyond the outer surface of the slip rim and surrounded by the inner convolution of the coil spring 7, a portion of this convolution engaging the same. The outer abutment or cap 9 has the main body portion 13 and the inwardly extending conical portion 14 having a polygonal aperture 15, such as a square opening, in its inner end.

To position each of the outer abutments or caps 9, engagers 16 are provided secured to the inner surface of a pliable non-elastic fibrous belt 21 by suitable metallic headed securing means 17. This belt surrounds the outer abutments or caps and prevents undue expansion of the coil springs 7. The engagers have conical portions 18 having open ends, which conical portions are adapted to be engaged by the conical portions 14 of the outer abutments or caps 9.

In order to individually compress the coil springs 7 when assembling or disassembling the tire, the ends of the inner abutments 8 are suitably apertured for the passage of an externally threaded member (not shown), which is engageable with the internally threaded stems 19 of the nuts 20 seated in the conical portions 18 of the engagers, the stems being of the same polygonal shape as the apertures 15 and extending therethrough, so that they are prevented from turning.

The belt 21 is an inherent part of the tread member or casing 6 and is surrounded by the fabric 22, which in turn is surrounded by the rubber 23 having the inwardly extending flanges or side walls 24.

For the purpose of relieving the coil springs 7 of side thrust, or thrust in a direction transverse of the plane of the wheel, the bearing plates 25 are provided secured to the inner sides of the flanges or side walls 24 and adapted to bear against the sides of the coil springs. 26 are retaining rings at opposite sides of the spring tire and secured upon the felly band 3, these retaining rings bearing against the outer sides of the flanges or side walls 24 of the casing. With this arrangement it is seen that the bearing plates 25 perform the additional function of protecting the flanges or side walls 24 from the wearing action of the springs 7.

In order to relieve the springs from circumferential stress or stress parallel to the plane of the wheel, the non-creeper members 27 are provided secured to the slip rim 4 and extending radially between the coil springs 7 and adapted to be engaged thereby.

What I claim as my invention is:

1. In a spring tire, the combination with a felly, of a series of spring elements arranged circumferentially around said felly, each spring element comprising inner and outer abutments and a coil spring therebetween, a pliable non-elastic fibrous belt surrounding said outer abutments, and projections upon said belt detachably engaging said outer abutments for positioning the same.

2. In a spring tire, the combination with a felly of a series of spring elements arranged circumferentially around said felly, each element comprising inner and outer abutments and a coil spring therebetween, a casing removably surrounding said spring elements and including a pliable non-elastic fibrous belt, and inwardly-extending positioning means upon said belt detachably engaging said outer abutments.

3. In a spring tire, the combination with a slip rim, of a series of spring elements arranged circumferentially around said slip rim, each spring element comprising inner and outer spring abutments and a coil spring therebetween, said outer abutments having hollow inwardly extending projections, a pliable belt surrounding said outer abutments and positioning members permanently secured to the inner surface of said belt and having inwardly extending projections slidably engageable within said hollow inwardly extending projections of said outer abutments.

4. In a spring tire, the combination with a felly, of a series of spring elements arranged circumferentially around said felly, each spring element comprising inner and outer spring abutments, and a coil spring therebetween, a casing surrounding said spring elements and having side walls at the sides of said springs, said casing including a belt of substantially constant length, bearing plates secured to the inner sides of said side walls and engageable by said coil springs, and retainer rings at the outer sides of said side walls and mounted upon said felly.

5. In a spring tire, the combination with a felly, of a series of spring elements arranged circumferentially around said felly, each spring element comprising inner and outer spring abutments and a coil spring therebetween, a casing surrounding said spring elements and having side walls at the sides of said springs, bearing plates secured to the inner sides of said side walls and engageable by said coil springs, retainer rings at the outer sides of said side walls and mounted upon said felly, and a non-creeper member in fixed relation to said felly and arranged between adjacent coil springs, said non-creeper member being engageable thereby.

6. In a spring tire, the combination with a felly and a felly band, of a spring section attachable to and detachable from said felly band as a unit, comprising a slip rim and series of spring elements arranged circumferentially around said slip rim, each spring element including an inner abutment engaging in an aperture in said slip rim, an outer abutment and a coil spring between said abutments, a casing surrounding said spring elements and including a pliable fibrous belt, positioning members upon the inner surface of said belt, having projections detachably surrounded by said outer abutments, and nuts mounted in said projections and having internally threaded stems extending through and non-rotatably engaging said outer abutments.

7. In a spring tire, the combination with a felly, of a series of spring elements arranged circumferentially around said felly, each spring element comprising a coil spring and an abutment at its outer end, a pliable non-elastic belt removably surrounding said spring elements and projections upon said belt detachably engaging said abutments for positioning the same.

In testimony whereof I affix my signature.

JOHN DAVIS.